United States Patent
Chatzistamatiou et al.

(10) Patent No.: US 12,073,642 B2
(45) Date of Patent: Aug. 27, 2024

(54) OBJECT DETECTION USING NEURAL NETWORKS

(71) Applicant: ACCENTURE GLOBAL SOLUTIONS LIMITED, Dublin (IE)

(72) Inventors: Andre Chatzistamatiou, Essen (DE); Florin Cremenescu, Biot (FR); Jomarie Rodelas Garcia, Batangas (PH); Guillaume Debard, Antibes (FR); Nadia Elina Alaiyan, Paris (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 379 days.

(21) Appl. No.: 17/697,721

(22) Filed: Mar. 17, 2022

(65) Prior Publication Data
US 2023/0230402 A1  Jul. 20, 2023

(30) Foreign Application Priority Data

Jan. 18, 2022  (EP) .................................. 22305045
Jan. 18, 2022  (EP) .................................. 22386001

(51) Int. Cl.
*G06V 30/19* (2022.01)
*G06V 10/82* (2022.01)
*G06V 30/226* (2022.01)
*G06V 30/413* (2022.01)

(52) U.S. Cl.
CPC ........ *G06V 30/19147* (2022.01); *G06V 10/82* (2022.01); *G06V 30/226* (2022.01); *G06V 30/413* (2022.01)

(58) Field of Classification Search
None
See application file for complete search history.

(56) References Cited

U.S. PATENT DOCUMENTS

| | | | |
|---|---|---|---|
| 2012/0169842 A1* | 7/2012 | Chuang | H04N 7/181 348/E7.001 |
| 2021/0064859 A1* | 3/2021 | Muramatsu | G06V 30/414 |
| 2021/0357674 A1* | 11/2021 | Ogawa | G06V 10/82 |

OTHER PUBLICATIONS

Gonzalo Pajares et al., "A wavelet-based image fusion tutorial", Elsevier, GB, vol. 37, No. 9, Sep. 1, 2004, pp. 1855-1872.
Victor Kleber et al., "A Fully Convolutional Network for Signature Segmentation from Document Images", 2018 16th International Conference on Frontiers in Handwriting Recognition (ICFHR), IEEE Aug. 5, 2018, pp. 540-545.

* cited by examiner

*Primary Examiner* — Darryl V Dottin
(74) *Attorney, Agent, or Firm* — Mannava & Kang, P.C.

(57) ABSTRACT

Systems and methods for facilitating an automated detection of an object in a test document are disclosed. A system may include a processor including a dataset generator. The dataset generator may obtain a first input image and a first original document from a data lake. The dataset generator may prune a portion of the first original document to obtain a pruned image. The dataset generator may blend the first input image with the pruned image to generate a modified image. The modified image may include the pruned image bearing the first pre-defined representation. The modified image may be combined with the first original document to generate a training dataset. The training dataset may be utilized to train a neural network based model to obtain a trained model for the automated detection of the object in the test document.

20 Claims, 11 Drawing Sheets

350 →

Please let me know if you have any changes for the proposed program.

Looking forward to seeing you again,

Yours very truly,

J.B. Boder cc: Messrs. B. Kuhn
         E. Stoop

Encl.: mentioned

306

OBJECT DETECTION USING NEURAL NETWORKS

PRIORITY

The present application claims priority under 35 U.S.C. 119(a)-(d) to European patent application numbers 22305045.1, and 22386001.6, both having a filing date of Jan. 18, 2022, the disclosures of which are hereby incorporated by references in their entireties.

BACKGROUND

Digitized documents are generally used across various business organizations. These digitized documents may need processing to facilitate detection and extraction of objects therein. For example, the digitized documents (such as scanned documents) may require effective detection of objects, such as, for example, signatures for purpose of validation and identification. This may be applicable in case of several administrative documents such as, for example, legal documents, bank cheques, and ID cards. One commonly known technique for recognition of text includes Optical Character Recognition (OCR). However, detection and extraction of objects such as, for example, signatures, may not be practically feasible using conventional tools, such as OCR. Further, in case of unstructured documents, the detection of such objects may be challenging as the object may be located anywhere in the document, unlike structured documents having a pre-defined expected position (such as, for example, a signature field). Furthermore, objects such as signature may not include definite text or font and/or may overlap with other field.

Conventional tools for object/signature extraction may include, for example, classical computer vision methods. In this technique, contour detection is performed after binarization of a document, and all relatively small contours are removed. Assuming that the document contains printed letters except for the signature, only the signature may remain as it may include a relatively large contour. However, such a technique may have limitations, as it may not work if other large contours are present on the image, such as, for example, logos or text with a large font size.

Deep learning neural networks may be a feasible choice for developing reliable models for object detection. However, these models may require significant training data for high accuracy. Especially, it may be very challenging to obtain diverse training datasets especially for objects such as signatures, given their uniqueness and variance. Moreover, the training datasets may not be customizable and/or may not be effective in training the model to identify the objects from any location in a test document. This may lead to ineffective, slow and inaccurate detection of objects, thereby nullifying the merits of digitization.

SUMMARY

An embodiment of present disclosure includes a system including a processor. The processor may be coupled to a data lake. The data lake may store digitized input datasets including a plurality of input images and a plurality of original documents. Each input image may include a pre-defined representation of the object. The processor may include a dataset generator. The dataset generator may obtain a first input image and a first original document from the data lake. The first input image may be obtained from the plurality of input images and the first input document may be obtained from a plurality of original documents. The first input image may bear a first pre-defined representation of the object. The dataset generator may prune a portion of the first original document to obtain a pruned image. The dataset generator may blend the first input image with the pruned image using a blending technique. The blending may lead to a modified image. The modified image may include the pruned image bearing the first pre-defined representation. The modified image may be combined with the first original document to generate a training dataset. In an example embodiment, the training dataset may be utilized to train a neural network based model to obtain a trained model. The trained model may be used for the automated detection of the object in the test document.

Another embodiment of the present disclosure may include a method for facilitating an automated detection of an object in a test document. The method may include a step of obtaining a first input image from a plurality of input images and a first original document from the plurality of original documents. The first input image may bear a first pre-defined representation of the object. The plurality of input images and the plurality of original documents may be stored as digitized input datasets in a data lake. Each input image may include a pre-defined representation of the object. The method may include a step of pruning a portion of the first original document to obtain a pruned image. The method may include a step of blending the first input image with the pruned image to obtain a modified image. The blending may be performed using a blending technique. The modified image may include the pruned image bearing the first pre-defined representation. The method may include a step of combining the modified image with the first original document to generate a training dataset. The method may include a step of training a neural network based model with the training dataset to obtain a trained model. The method may include a step of detecting automatically the object in the test document by utilizing the trained model.

Yet another embodiment of the present disclosure may include a non-transitory computer readable medium comprising machine executable instructions that may be executable by a processor to obtain a first input image from a plurality of input images and a first original document from a plurality of original documents. The first input image may bear a first pre-defined representation of the object. The plurality of input images and the plurality of original documents may be stored as digitized input datasets in a data lake. Each input image may include a pre-defined representation of the object. The processor may prune a portion of the first original document to obtain a pruned image. The processor may blend the first input image with the pruned image to obtain a modified image. The blending may be performed using a blending technique. The modified image may include the pruned image bearing the first pre-defined representation. The processor may combine the modified image with the first original document to generate a training dataset. The processor may train a neural network based model with the training dataset to obtain a trained model. The processor may automatically detect the object in the test document by utilizing the trained model.

DETAILED DESCRIPTION

Figure 1:
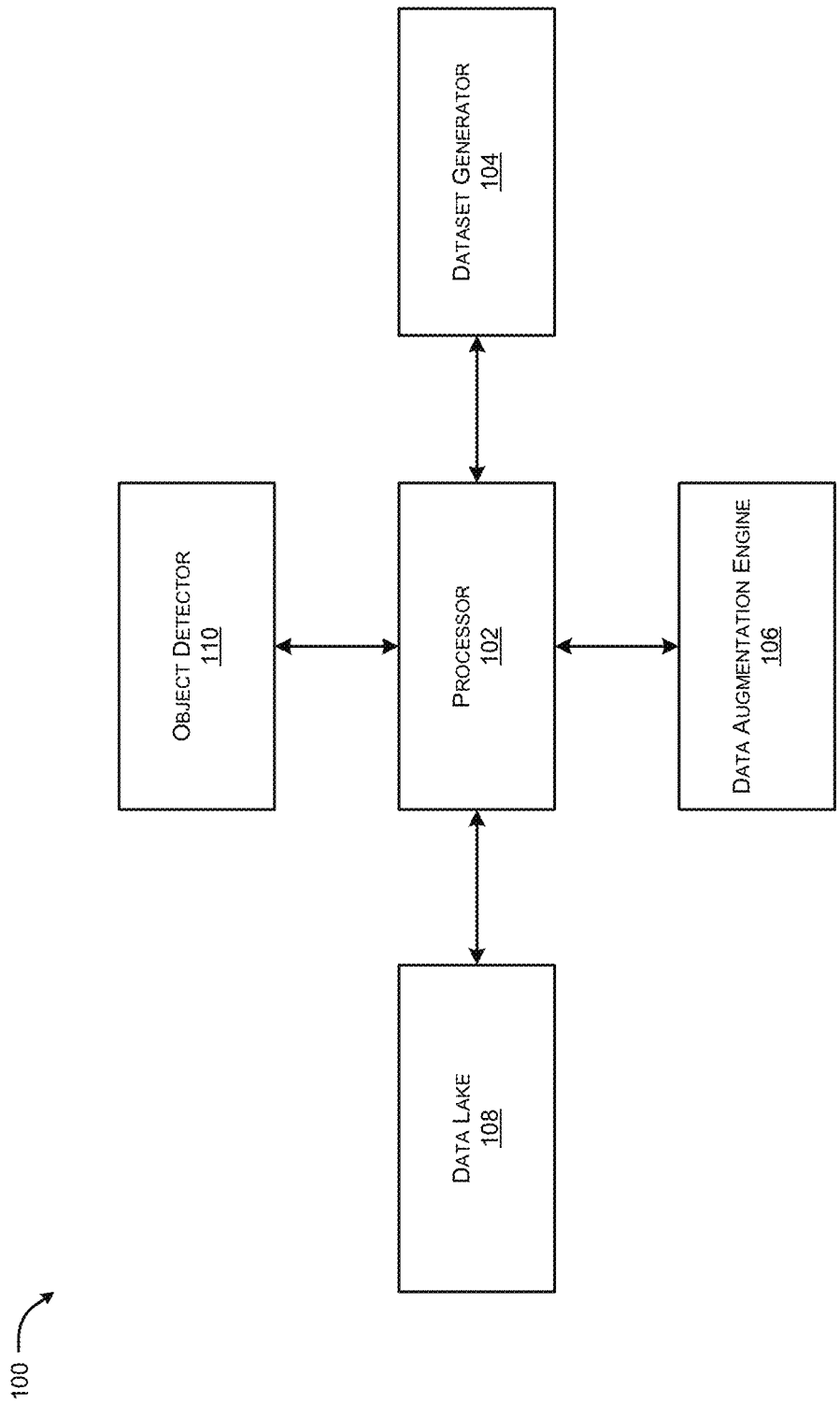
FIG. 1 illustrates a system for facilitating an automated detection of an object in a test document, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

OVERVIEW

Various embodiments describe providing a solution in the form of a system and a method for facilitating an automated detection of an object in a test document. The system may include a processor. The processor may be coupled to a data lake. The data lake may store digitized input datasets including a plurality of input images and a plurality of original documents. In an example embodiment, each input image may include a pre-defined representation of the object. The processor may include a dataset generator that may obtain a first input image and a first original document from the data lake. The first input image may be obtained from the plurality of input images and the first input document may be obtained from a plurality of original documents. The first input image may bear a first pre-defined representation of the object. The dataset generator may prune a portion of the first original document to obtain a pruned image. The dataset generator may blend the first input image with the pruned image using a blending technique. The blending may lead to a modified image. The modified image may include the pruned image bearing the first pre-defined representation. The modified image may be combined with the first original document to generate a training dataset. In an example embodiment, the training dataset may be utilized to train a neural network based model to obtain a trained model. The trained model may be used for the automated detection of the object in the test document.

Exemplary embodiments of the present disclosure have been described in the framework for facilitating an automated detection of an object in a test document. The embodiments may describe a system and a method to perform facilitating an automated detection of the object in the test document through a neural network based model. The automated detection may be performed through a neural network based model using a training dataset. Some embodiments may describe a system and a method to generate the training dataset for training the neural network based model. The training dataset may be generated based on a plurality of input images and a plurality of original documents in the data lake. The system and method may combine one or more of the input images with each original document in a unique manner. For example, the dataset generator may prune and blend the input image with the original document to generate the training dataset. Once the neural network based model may be trained using the training dataset, the model may be able to automatically locate the objects on test documents. The detection of objects may be performed for objects, for example, a handwritten signature or a digital signature so that the model can automatically detect the signature on the test documents. However, the objects may not be restricted to signatures, but also may be used for other objects such as, for example, signature, a digital signature, a checkbox section, an image, a handwritten text and a drawing. The automated detection may be especially useful in case when the object is to detected in unstructured documents. For example, if an object, such as, a signature, needs to be detected and if the location of the signature section may not be pre-defined, the automated detection may act as smart tool for locating the signatures. The system and method of the present disclosure may be applied to several applications that involve object detection in fields, such as, for example, banking, insurance, capital markets, travel, hospitality, health care, and other such fields. For example, the present disclosure may be useful for processes such as insurance processing, loan processing, and banking that may require to extract objects (such as signatures or some sections) from a large number of documents/forms for authentication/identification. However, one of ordinary skill in the art will appreciate that the present disclosure may not be limited to such applications. The system may also be integrated with other tools or application that require automated detection of objects in document. Several other advantages may be realized.

FIG. 1 illustrates a system 100 for facilitating an automated detection of an object in a test document, according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a processor 102. The processor 102 may be coupled to a data lake 108. The data lake 108 may store digitized input datasets including a plurality of input images and a plurality of original documents. In an example embodiment, each input image may include a pre-defined representation of the object. The processor 102 may include a dataset generator 104 that may obtain a first input image and a first original document from the data lake. The first input image may be obtained from the plurality of input images and the first input document may be obtained from a plurality of original documents. The first input image may bear a first pre-defined representation of the object. The dataset generator 104 may prune a portion of the first original document to obtain a pruned image. In an example embodiment, the portion to be pruned may be decided on a random basis. In an example embodiment, the pruning may be performed using open computer vision (CV) library. The dataset generator 104 may blend the first input image with the pruned image using a blending technique. In an example embodiment, the blending may be performed based on global parameters that control the blending. The blending may lead to a modified image. The modified image may include the pruned image bearing the first pre-defined representation. The modified image may be combined with the first original document to generate a training dataset. In an example embodiment, the training dataset may be utilized to train a neural network based model to obtain a trained model. The trained model may be used for the automated detection of the object in the test document. In an example embodiment, the processor may include an object detector to detect the objects using the trained model. The processor 102 may include a data augmentation engine 106. The data augmentation engine 106 may augment the generated training dataset to obtain an augmented dataset. The augmented dataset may be obtained by processing the training dataset. The processing may be performed by at least one of noise removal, background editing, reduction of blurring effect, object cropping, object flipping, object rotation, object scaling, brightness adjustment, contrast adjustment and duplication of the first pre-defined representation of the object.

The system 100 may be a hardware device including the processor 102 executing machine readable program instructions to facilitate an automated detection of an object in a test document. Execution of the machine readable program instructions by the processor 102 may enable the proposed system to facilitate an automated detection of an object in a test document. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as processing, data/object extraction, object detection and/or any other functions. Any reference to a task in the present disclosure may refer to an operation being or that may be performed on data.

The original documents used for generating the training dataset may pertain to forms and/or contracts that may correspond to a domain of interest. For example, the neural network based model may be trained for object detection for banking applications by utilizing banking forms and other such pre-stored documents. Further, the first pre-defined representation of the object may be particularly useful in training the model with variety of possible forms of the object. For example, if signature may be required to be detected, the system may combine various possible forms of signatures. For example, some signature samples may be hand-written whereas some may be digital signatures. In addition, the position at which the signature may be present may not be pre-defined in case of unstructured documents. This can make it extremely challenging to detect objects for extraction using conventional tools/techniques. The present disclosure ensures that the training datasets are generated in such a way that the neural network based model may be trained using a wide variety or diverse datasets, which can be useful to detect objects in any type of test documents (including unstructured documents).

Figure 2:
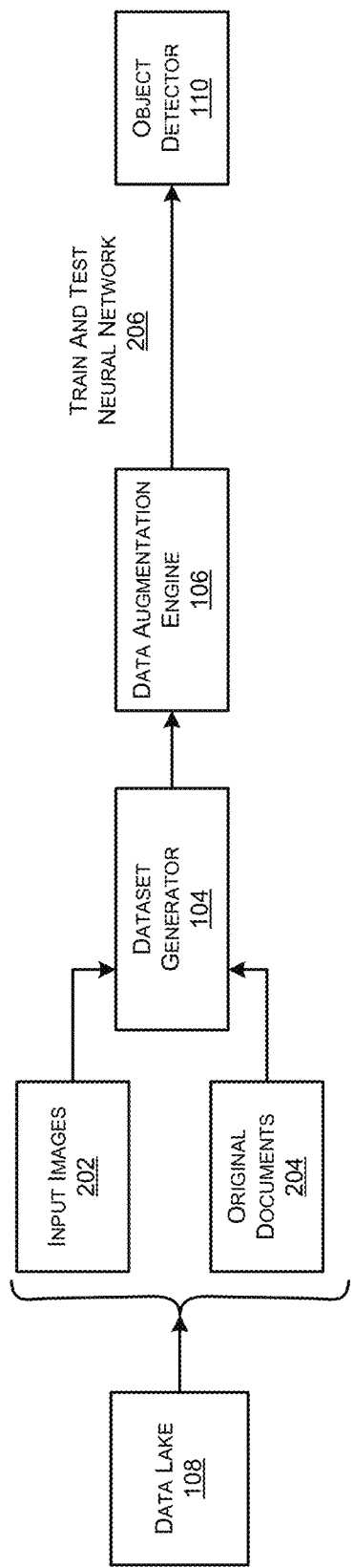
FIG. 2 illustrates an exemplary representation of stages involved in automated detection of an object in a test document, according to an example embodiment of the present disclosure.

FIG. 2 illustrates an exemplary representation of stages involved in automated detection of an object in a test document, according to an example embodiment of the present disclosure. As illustrated in FIG. 2, the data lake 108 may store a 104 store digitized input datasets including a plurality of input images and a plurality of original documents. In an example embodiment, the dataset generator 104 may obtain a first input image and a first original document from the data lake. The first input image may be received from the plurality of input images 202 and the first original document may be received from the plurality of original documents 204. The first input image may bear a first pre-defined representation of the object. In an example embodiment, the object may include at least one of a signature, a digital signature, a checkbox section, an image, a handwritten text and a drawing. For example, in one instance, the object may be signature that may be needed to be detected for extraction. In another instance, the object may be a checkbox section (for example, checkbox in a questionnaire) that may needed to be detected in a test document. Several other objects may be included. In an example embodiment, the plurality of input images may pertain to a set of diverse image samples bearing the object. For example, the input image may be snippets of a signature sample. Each input image may include a pre-defined representation of an object. In an example embodiment, the pre-defined representation may pertain to a variation in the form of the object. For example, assuming the object is a signature, it can be unique for each individual and also different individuals may have different styles of signing. For example, some individuals may sign with only initials, while signature of other individuals may include a name in cursive writing. The automated object detection thus can be useful with respect to variation in form of the object. Further, not only the variety of styles but also the position of signature in a form/document may vary. For example, for additional authentication, an individual may sign across the margins in addition to a pre-defined position. The present system and method may enable to train the model with varying instances of object position in the original documents. This may facilitate automated object detection with respect to even variation in position of the object. In an example embodiment, the plurality of original documents 204 may include pre-stored forms or documents pertaining to a domain. For example, the original documents may be bank forms that may be used at the time of an account registration. In another example, the original document may be an insurance form. Several other documents may be included in the original documents.

In an example embodiment, the dataset generator 104 may loop through the plurality of original documents 204 and selects the first original document. The first original document may be processed to create a batch including multiple copies of the first original document. For each copy of the first original document, the dataset generator 104 may randomly select the first input image from the plurality of images 202. In an alternate embodiment, selection of the first input image and the first document may be customized as per the requirements of an end application. Further, in an example embodiment, the first input image and/or the first original document may be pre-processed as per standard requirements. For example, prior to processing, one standard requirement may be to arrange the first original document as per an expected layout/orientation, such as, for example, in portrait or landscape. The dataset generator 104 may generate the training dataset using the first input image and the first original document. This may be achieved by pruning a portion of the first original document to obtain a pruned image. The pruning may refer to cropping the portion of the original document. The portion that is cropped may correspond to a position where the first input image that may be required to be inserted in the first original document. The dataset generator 104 may blend the first input image with the pruned image to obtain a modified image. The blending may be performed by using a blending technique, such as, for example, wavelet transformation or a thresholding technique. In an example embodiment, the blending may be performed by at least one of Poisson Blending, Image Melding, Interactive Digital Photomontage, Fast Poisson Blending using Multi-Splines and other such techniques. The blending may reduce sharp transitions to enable to generate effective training dataset. Further, the modified image may be combined with the first original document to generate a training dataset. In an alternate embodiment, the pruning may be performed to derive a pruned document including only the portion of interest (of the first original document) such that the step of blending may generated a pruned document bearing the object. In the instant embodiment, the pruned document including the object may be combined with the first original document to obtain the training dataset. The dataset generator 104 may generate such multiple training datasets for training the neural network based model based on the requirements of training the model.

Figure 3A:
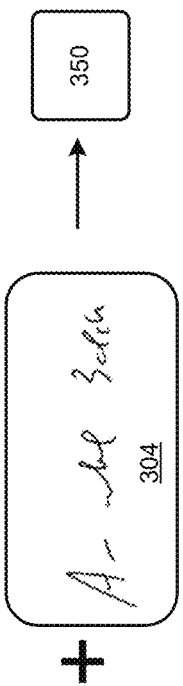
FIGS. 3A-3B illustrate an exemplary representation of a generated training dataset, according to an example embodiment of the present disclosure.
Figure 3A:
Figure 3B:
Figure 3B:
Figure 4:
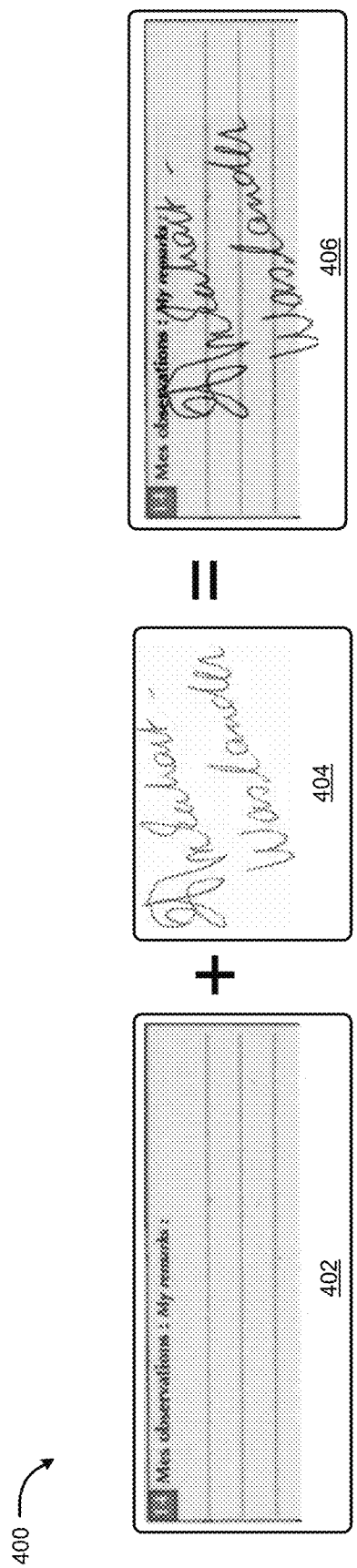
FIG. 4 illustrates an exemplary representation of a modified image, according to an example embodiment of the present disclosure.

FIGS. 3A-3B illustrate an exemplary representation of a generated training dataset, according to an example embodiment of the present disclosure. As illustrated in FIG. 3A, a first input image 304 may be an image including a signature. The first input image 304 may be combined with first original document 302 in the manner as described hereinabove. The output may be in the form of a may be utilized to generate a training dataset 350. As observed in FIG. 3B (350), the signature pertaining to 304 is blended with 302 in its second half portion. FIG. 4 illustrates an exemplary representation 400 of a modified image, according to an example embodiment of the present disclosure. In an example embodiment, and as illustrated in FIG. 4, the first input image may be signature based image 404 that may be required to be blended with the first a portion of the first original document. The dataset generator may pruned a portion of the first original document to obtain a pruned image 402 as illustrated in FIG. 4. The dataset generator may blend the first input image 404 with the pruned image 402 to obtain a modified image 406. The blending may be performed to reduce sharp transitions to enable to generate effective training dataset.

In an example embodiment, the system may build an annotation for the training datasets. For example, at least one of the modified document, the training dataset and the augmented dataset may be annotated to obtain an annotated dataset. The annotated dataset may be indicative of an information pertaining to the at least one of co-ordinates of the object on the annotated dataset and a local storage path of the modified image. For example, to build the annotated dataset, the system may label the modified image and/or the training dataset such that the position of the blended object in the training dataset may be included. In another example, the system may save the modified image and/or the training dataset in a specific local storage such that information of the storage location may be included in the annotated dataset. Upon generation of the training dataset, the data augmentation engine 106 may augment the generated training dataset to obtain an augmented dataset. In an example embodiment, the augmented dataset may be obtained by processing the training dataset. The augmented dataset may be an enhanced or corrected version of the training dataset that may lead to improvement in one or more features of the training dataset for effective training. For example, the augmented dataset may be obtained by processing the training dataset through at least one of noise removal, background editing, reduction of blurring effect, object cropping, object flipping, object rotation, object scaling, brightness adjustment, contrast adjustment and duplication of the first pre-defined representation of the object.

In an example embodiment, the neural network based model may be trained based on at least one of the first original document, the training dataset, the augmented dataset and the annotated dataset. The neural network based model may be a model pertaining to the feature "You Only Look Once" (YOLO) that may enable to detect object in a single pass. In an example embodiment, the neural network based model may be a convolutional neural network (CNN) based model. In an example embodiment, the neural network based model may be an object detection model, such as, for example, Faster region based CNN (R-CNN), single shot detector (SSD), RetinaNet or other such techniques. The trained model may detect the objects in a document in an accurately and in in real-time. The trained model may also be able to detect objects in a test document irrespective the position of the object on the document. For example, the object such as signature may be present on any portion of the test document and may not be limited to fields/sections such as "Sign here", which may be undetectable by conventional techniques/models. This may be mainly because the model may not be trained to locate the signatures in places other than pre-defined positions. However, using the trained model that is trained using the unique training datasets generated by the system of the present disclosure, objects present in other than pre-defined positions in the test document can also be effectively detected. The training datasets (and corresponding augmented and annotated datasets) may be exponentially generated by applying various data augmentation techniques. For example, the training datasets (or augmented datasets) may be obtained by rotation or flipping, noise processing (or addition), placement of objects (signatures) over existing text and by combination/blending of the objects with multiple documents. This leads to generated of a diverse training datasets (or augmented datasets) for effective training of the neural network based model.

The trained model may be tested prior to deploying for object detection in test documents. For example, the performance of the trained model may be validated by assessing a set of inferences obtained by the automated detection of the object in a validation dataset. The validation dataset may be a set of document that may be used to evaluating performance of the trained model prior to the deployment of the model. In an example embodiment, if performance of the trained model may exceed a pre-defined threshold value, the trained model may be deployed for the automated detection of the object in the test document. In an alternate example embodiment, if the performance of the trained model may fail to exceed the pre-defined threshold value, the trained model may be re-trained by utilizing another training dataset. The performance may be assessed with respect to measurement of one or ore parameters. For example, the parameter may include at least one of accuracy, error estimation, precision, number of attempts performed to detect the object in the validated dataset and time taken to detect the object in the validated dataset. In an example embodiment, the parameter may pertain to metrics such as, for example, mean Average Precision (mAP) and mean Average Recall (mAR), both of which may be required for estimating the model performance. Various other parameters may be included to test the performance of the trained model.

Referring back to FIG. 2, and in an example embodiment, the object detector 110 may utilize the trained model to perform the automated detection of the object in a test document. The test document may pertain to at least one of structured document and unstructured document. In an example embodiment, prior to the automated detection, the test document may be subjected to at least one of pre-processing and segmentation. The pre-processing and/or segmentation may pertain to at least one of a noise removal, background editing, reduction of blurring effect, rotation of the test document, brightness adjustment, contrast adjustment and other functions that may be essential for improving the accuracy of object detection. In an alternate embodiment, the pre-processing and/or segmentation may be optional. a performance of the trained model is validated by assessing a set of inferences obtained by the automated detection of the object in a validation dataset.

Figure 5A:
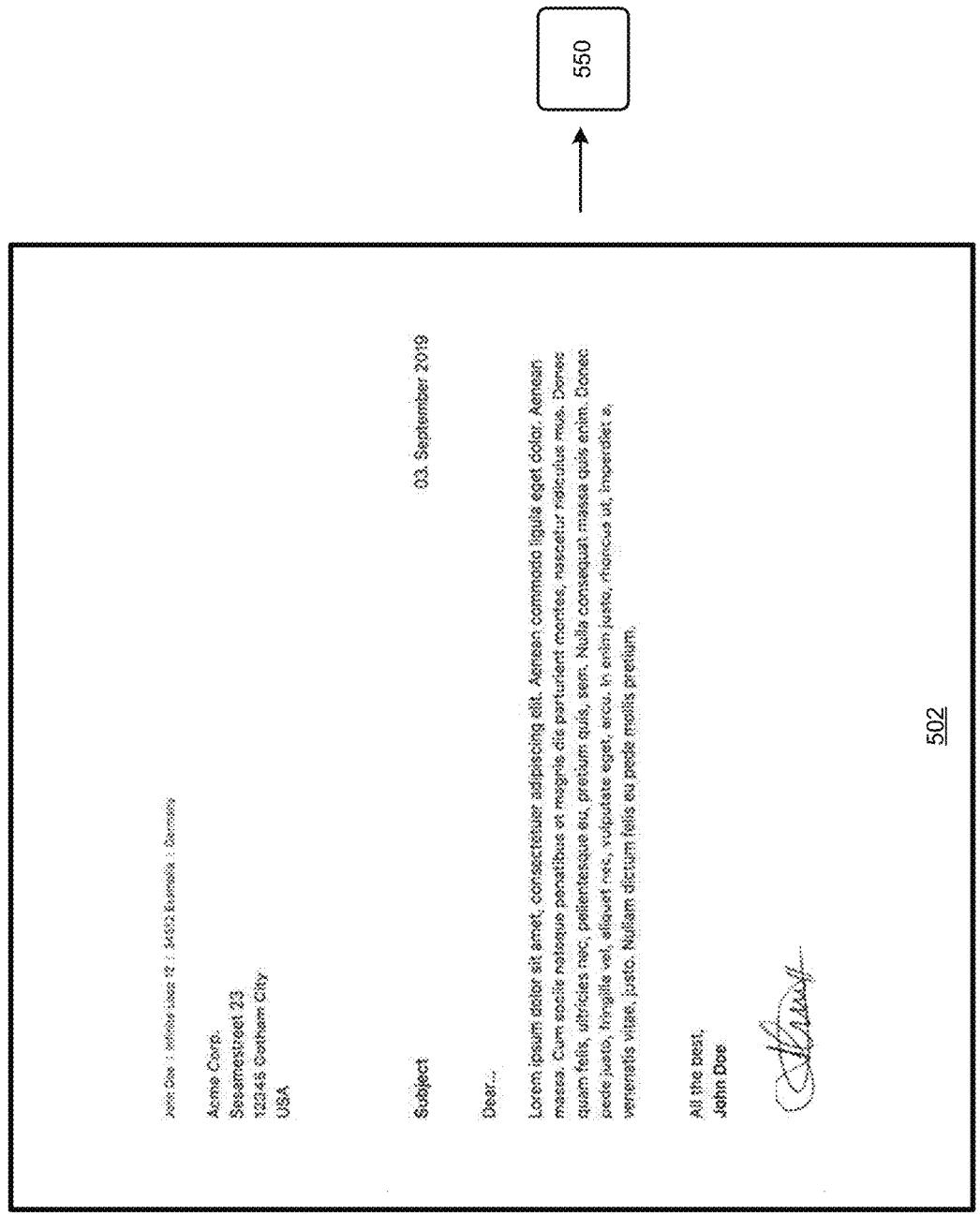
FIGS. 5A-5B illustrate an exemplary representation for automated detection of an object in a test document, according to an example embodiment of the present disclosure.
Figure 5B:
Figure 5B:
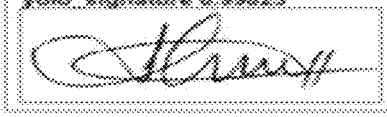

FIGS. 5A-5B illustrate an exemplary representation for automated detection of an object in a test document, according to an example embodiment of the present disclosure. In an example embodiment, and as illustrated in FIG. 5A, the system (object detector 110 of FIG. 1) may receive a test document 502 in which an object (such as a signature) may be required to be detected. In this example, the test document 502 is a scanned document (for example a human resources (HR) form) that contains a signature. As shown in FIG. 5B (550), the object detector efficiently performs the object detection on the test document 502 (of FIG. 5A) to locate the object (as shown in rectangular box in 504 in FIG. 5B). In an example embodiment, upon detection of the object in the test document, the object detector 110 may also provide co-ordinates of the detected object with respect to the test document. For example, the object detector 110 may detect co-ordinates such as, for example, X and Y coordinates, width, and height of the signature. In an alternate embodiment, the co-ordinates of detected object may also be used for annotating the test documents, which may be useful for later training of the neural network based model. As shown in FIG. 5B, the signature may be detected and highlighted, for example, in a rectangular bounding box having a colored or black boundary. In an example embodiment, the highlighted portion may appear as shown in 506, wherein the system may also display a value that represents confidence level pertaining to the type of object as detected by the model/corresponding algorithm. For example, in the detected signature as shown in 506, the confidence level of the object being a signature seems to be around 85%.

Figure 6:
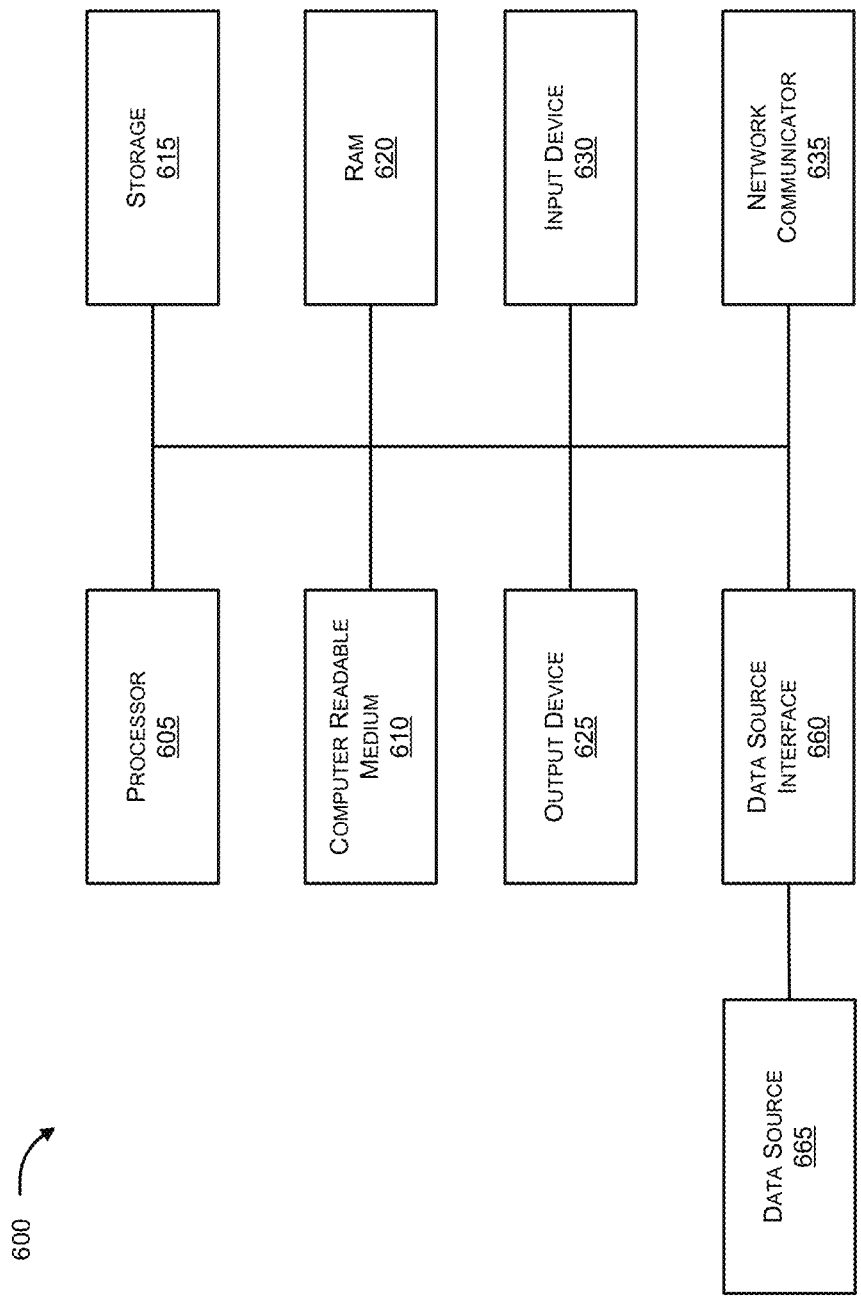
FIG. 6 illustrates a hardware platform for implementation of the disclosed system, according to an example embodiment of the present disclosure.

FIG. 6 illustrates a hardware platform (600) for implementation of the disclosed system, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 600. As illustrated, the hardware platform 600 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 900 may be a computer system such as the system 100 that may be used with the embodiments described herein. The computer system may represent a computational platform that includes components that may be in a server or another computer system. The computer system may execute, by the processor 605 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 605 that executes software instructions or code stored on a non-transitory computer-readable storage medium 610 to perform methods of the present disclosure. The software code includes, for example, instructions to generate the training datasets and the augmented datasets. In an example, the dataset generator 104, the data augmentation engine 106 may be software codes or components performing these steps.

The instructions on the computer-readable storage medium 610 are read and stored the instructions in storage 615 or in random access memory (RAM). The storage 615 may provide a space for keeping static data where at least some instructions could be stored for later execution. The stored instructions may be further compiled to generate other representations of the instructions and dynamically stored in the RAM such as RAM 620. The processor 605 may read instructions from the RAM 620 and perform actions as instructed.

The computer system may further include the output device 625 to provide at least some of the results of the execution as output including, but not limited to, visual information to users, such as external agents. The output device 625 may include a display on computing devices and virtual reality glasses. For example, the display may be a mobile phone screen or a laptop screen. GUIs and/or text may be presented as an output on the display screen. The computer system may further include an input device 630 to provide a user or another device with mechanisms for entering data and/or otherwise interact with the computer system. The input device 630 may include, for example, a keyboard, a keypad, a mouse, or a touchscreen. Each of these output device 625 and input device 630 may be joined by one or more additional peripherals. For example, the output device 625 may be used to display the training datasets and/or output of the object detection by the system 100.

A network communicator 635 may be provided to connect the computer system to a network and in turn to other devices connected to the network including other clients, servers, data stores, and interfaces, for instance. A network communicator 635 may include, for example, a network adapter such as a LAN adapter or a wireless adapter. The computer system may include a data sources interface 640 to access the data source 645. The data source 645 may be an information resource. As an example, a database of exceptions and rules may be provided as the data source 645. Moreover, knowledge repositories and curated data may be other examples of the data source 645.

Figure 7:
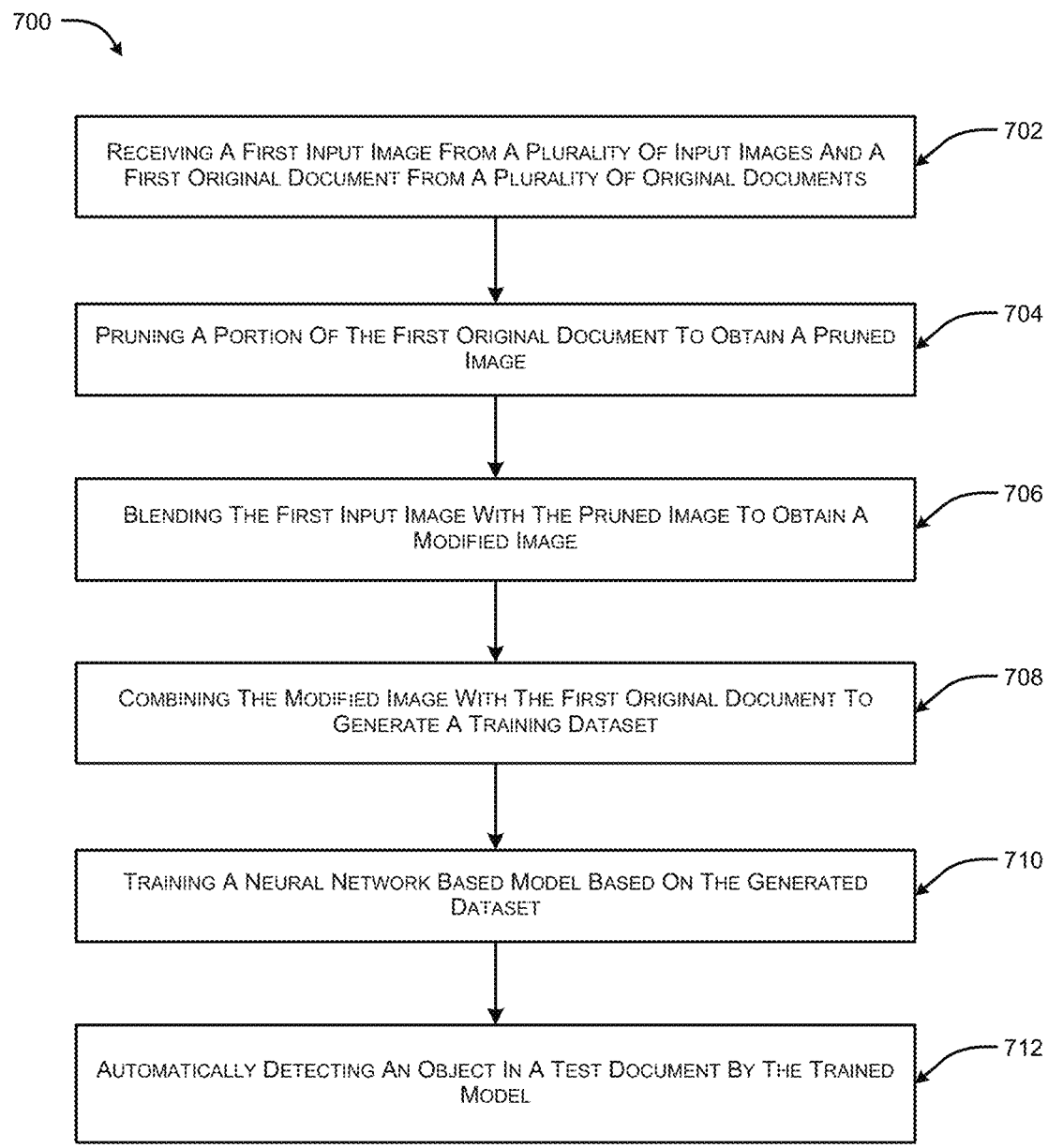
FIG. 7 illustrates a flow diagram for facilitating an automated detection of an object in a test document, according to an example embodiment of the present disclosure.

FIG. 7 illustrates a flow diagram 700 for facilitating an automated detection of an object in a test document, according to an example embodiment of the present disclosure. At 702, the method includes a step of obtaining a first input image from a plurality of input images and a first original document from the plurality of original documents. The first input image may bear a first pre-defined representation of the object. The plurality of input images and the plurality of original documents may be stored as digitized input datasets in a data lake. Each input image may include a pre-defined representation of the object. At 704, the method includes a step of pruning a portion of the first original document to obtain a pruned image. At 706, the method includes a step of blending the first input image with the pruned image to obtain a modified image. The blending may be performed using a blending technique. The modified image may include the pruned image bearing the first pre-defined representation. At 708, the method includes a step of combining, by the processor, the modified image with the first original document to generate a training dataset. At 710, the method includes a step of training a neural network based model with the training dataset to obtain a trained model. At 710, the method includes a step of detecting automatically the object in the test document by utilizing the trained model.

In an example embodiment, prior to detecting the object in the test document, the method may include a step of facilitating the test document to at least one of pre-processing and segmentation. In an example embodiment, the method may include a step of augmenting the generated training dataset to obtain an augmented dataset. The step of augmenting may include processing the training dataset. The processing may include at least one of noise removal, background editing, reduction of blurring effect, object cropping, object flipping, object rotation, object scaling, brightness adjustment, contrast adjustment and duplication of the first pre-defined representation of the object.

Figure 8:
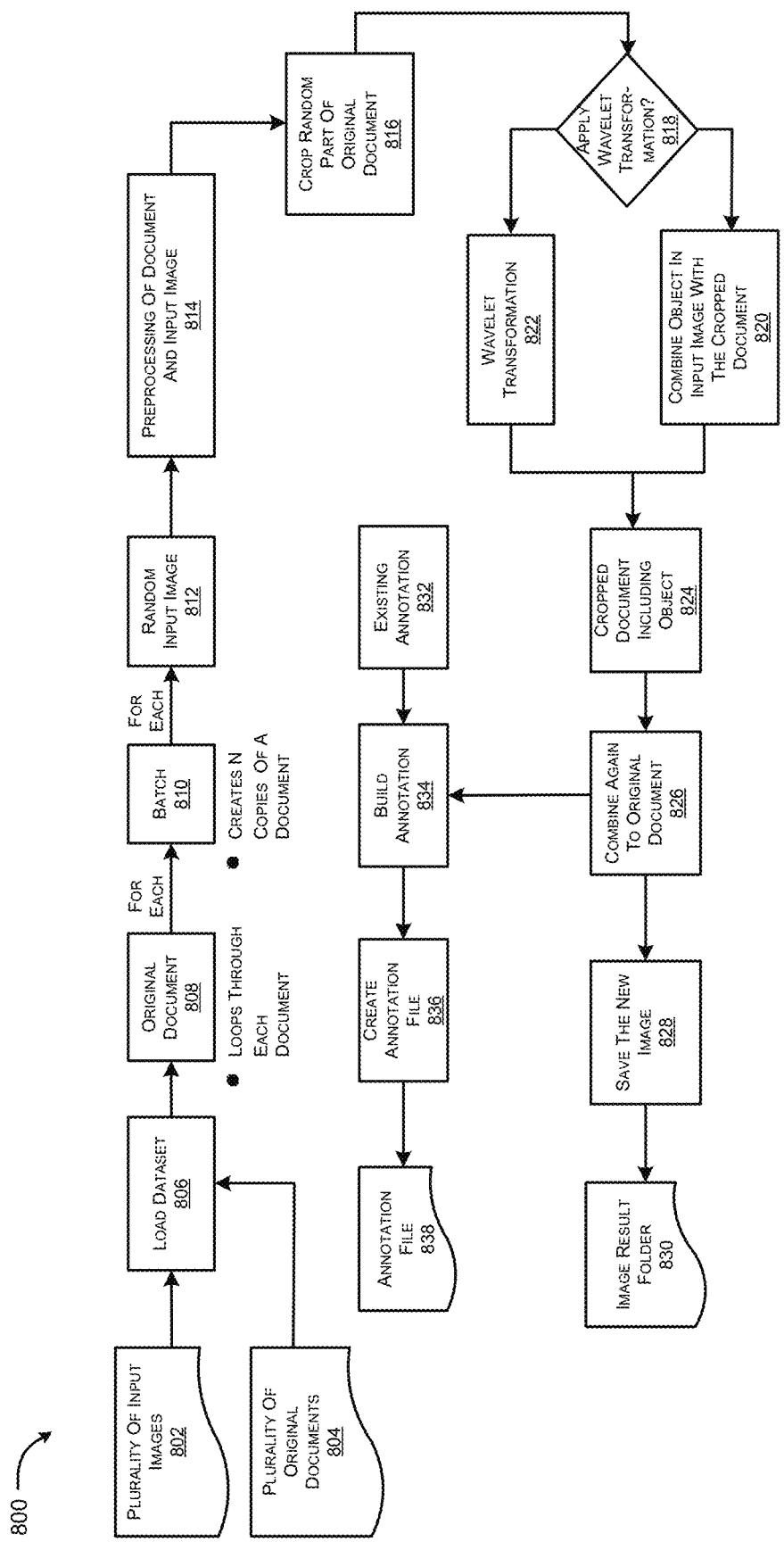
FIG. 8 illustrates an exemplary flow diagram for depicting steps involved in generation of training dataset and annotated dataset, according to an example embodiment of the present disclosure.

FIG. 8 illustrates an exemplary flow diagram for depicting steps involved in generation of training dataset and annotated dataset, according to an example embodiment of the present disclosure. At 806, a plurality of input images 802 and a plurality of original documents 804 may be loaded. At 808, the method may include may looping through the plurality of original documents 804 to select the first original document. At 810, the first original document may be processed to create a batch including multiple copies of the first original document. At 812, for each copy of the first original document, a first input image may be randomly selected from the plurality of images 802. Further, at 814, the first input image and/or the first original document may be pre-processed as per standard requirements. For example, prior to processing, one standard requirement may be to arrange the first original document as per an expected layout/orientation, such as, for example, in portrait or landscape. At 816, a portion of the first original document may be pruned (or cropped) to obtain a pruned image. The portion that is pruned or cropped may correspond to a position where the first input image may be required to be inserted in the first original document. The first input image may be blended with the pruned image to obtain a modified image. The blending may be performed by using a blending technique, such as, for example, wavelet transformation or a thresholding technique. The blending may reduce sharp transitions to enable to generate effective training dataset. At 818, the method may assess a need for applying a specific blending technique, for example, wavelet transformation. If necessary for the specific case, the method may apply the wavelet transformation at 822. In an example embodiment, decision to perform or to not perform the wavelet transformation may be based on global parameters that control the blending. If not necessary then the method may perform blending using other known techniques. At 826, the outcome or the modified image from any of the steps 822 or 820 may be combined with the first original document to generate a training dataset. The modified image and/or the training dataset may be labelled to indicate a position of the blended object in the training dataset. In another example, the system may save the modified image and/or the training dataset in a specific local storage or folder 830. At 834, the method may include a step of building an annotation for the training datasets. For example, at least one of the modified document, the training dataset and the augmented dataset may be annotated to obtain an annotated dataset (838). The annotated dataset may be obtained (step 836) by creating an annotation file that may pertain to at least one of co-ordinates of the object on the annotated dataset and a local storage path of the modified image. Upon generation of the training dataset, the data augmentation engine 106 may augment the generated training dataset to obtain an augmented dataset. In an example embodiment, the augmented dataset may be obtained by processing the training dataset. The augmented dataset may be an enhanced or corrected version of the training dataset that may lead to improvement in one or more features of the training dataset for effective training. For example, the augmented dataset may be obtained by processing the training dataset through at least one of noise removal, background editing, reduction of blurring effect, object cropping, object flipping, object rotation, object scaling, brightness adjustment, contrast adjustment and duplication of the first pre-defined representation of the object.

Figure 9:
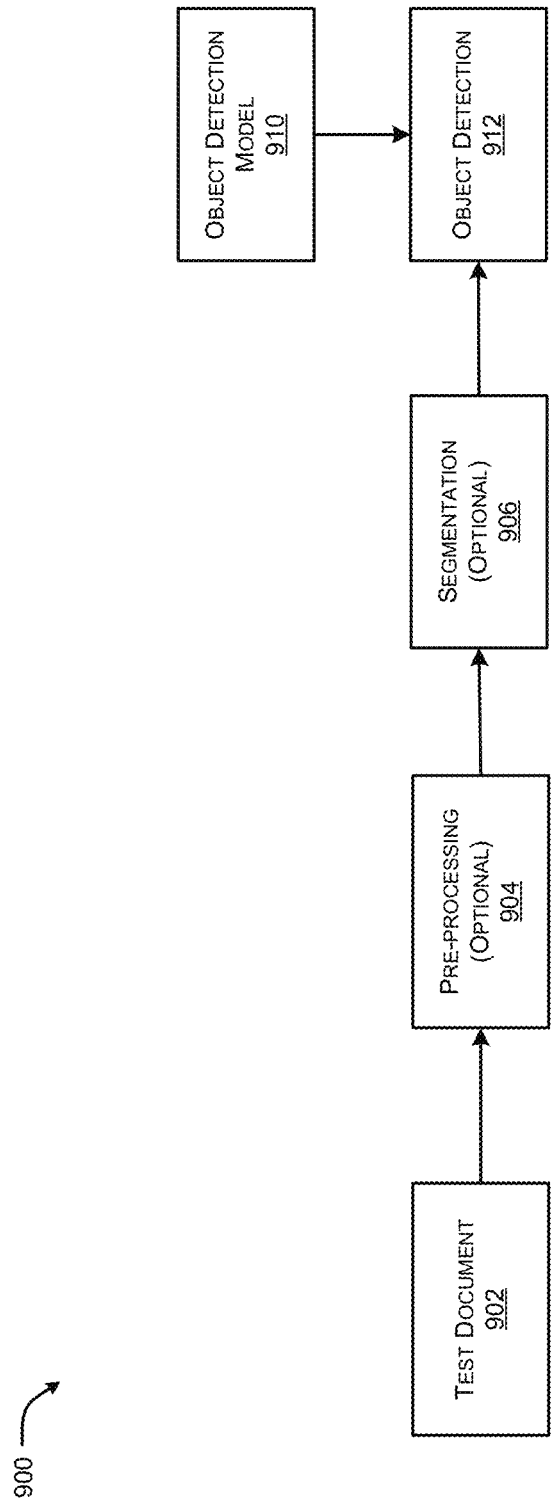
FIG. 9 illustrates an exemplary flow diagram depicting steps involved in automated detection of an object in a test document, according to an example embodiment of the present disclosure.

FIG. 9 illustrates an exemplary flow diagram depicting steps involved in automated detection of an object in a test document, according to an example embodiment of the present disclosure. As illustrated in FIG. 9, a test document 902 may be received in which an object (such as a signature) may be required to be detected. The test document may pertain to at least one of structured document and unstructured document. At 904, the test document may be subjected to pre-processing and at 906, test document may be subjected to segmentation. The pre-processing and/or segmentation may pertain to at least one of a noise removal, background editing, reduction of blurring effect, rotation of the test document, brightness adjustment, contrast adjustment and other functions that may be essential for improving the accuracy of object detection. In an alternate embodiment, the pre-processing and/or segmentation may be optional. At 912, the method may include the detection of the object on the test document to locate the object, by using the trained model.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system for facilitating an automated detection of an object in a test document, the system comprising:
   a processor coupled to a data lake to:
      store digitized input datasets comprising a plurality of input images and a plurality of original documents, wherein each input image includes a pre-defined representation of the object; and
   the processor comprising a dataset generator to:
      obtain, from the data lake, a first input image from the plurality of input images and a first original document from the plurality of original documents, the first input image bearing a first pre-defined representation of the object;
      prune a portion of the first original document to obtain a pruned image; and
      blend, using a blending technique, the first input image with the pruned image to obtain a modified image, wherein the modified image includes the pruned image bearing the first pre-defined representation;
      wherein the modified image is combined with the first original document to generate a training dataset, the training dataset being utilized to train a neural network based model to obtain a trained model, and wherein the trained model is used for the automated detection of the object in the test document.

2. The system as claimed in claim 1, wherein the object includes at least one of a signature, a digital signature, a checkbox section, an image, a handwritten text and a drawing.

3. The system as claimed in claim 1, wherein the plurality of input images pertains to a set of diverse image samples bearing the object, the pre-defined representation pertaining to a variation in the form of the object.

4. The system as claimed in claim 1, wherein the data generator loops through the plurality of original documents and selects the first original document, the first original document being processed to create multiple copies, and wherein, for each copy of the first original document, the data generator randomly selects the first input image.

5. The system as claimed in claim 1, wherein the blending technique comprises at least one of a wavelet transformation and a thresholding technique.

6. The system as claimed in claim 1, wherein the processor comprises:
   a data augmentation engine to:
      augment the generated training dataset to obtain an augmented dataset, wherein the augmented dataset is obtained by processing the training dataset to perform at least one of noise removal, background editing, reduction of blurring effect, object cropping, object flipping, object rotation, object scaling, brightness adjustment, contrast adjustment and duplication of the first pre-defined representation of the object.

7. The system as claimed in claim 6, wherein at least one of the modified document, the training dataset and the augmented dataset is annotated to obtain an annotated dataset, and the annotated dataset being indicative of an information pertaining to the at least one of co-ordinates of the object on the annotated document and a local storage path of modified image.

8. The system as claimed in claim 1, wherein the neural network based model is a convolutional neural network (CNN) based model.

9. The system as claimed in claim 7, wherein the neural network based model is trained using at least one of the first original document, the training dataset, the augmented dataset and the annotated dataset.

10. The system as claimed in claim 1, wherein a performance of the trained model is validated by assessing a set of inferences obtained by the automated detection of the object in a validation dataset.

11. The system as claimed in claim 10, wherein if the performance of the trained model exceeds a pre-defined threshold value, the trained model is deployed for the automated detection of the object in the test document, and
   wherein if the performance of the trained model fails to exceed the pre-defined threshold value, the trained model is re-trained by utilizing another training dataset.

12. The system as claimed in claim 10, wherein the performance is assessed with respect to measurement of a parameter including at least one of accuracy, error estimation, precision, number of attempts performed to detect the object in the validated dataset and time taken to detect the object in the validated dataset.

13. The system as claimed in claim 1, wherein the training dataset, the augmented dataset and the annotated dataset are digitized documents that are stored in the data lake, and wherein the test document and the first original document pertain to at least one of structured document and unstructured document.

14. The system as claimed in claim 1, wherein prior to the automated detection, the test document is subjected to at least one of pre-processing and segmentation.

15. A method for facilitating an automated detection of an object in a test document, the method comprising:
   obtaining, by a processor, a first input image from the plurality of input images and a first original document from the plurality of original documents, the first input image bearing a first pre-defined representation of the object, wherein the plurality of input images and the plurality of original documents are stored as digitized input datasets in a data lake, wherein each input image includes a pre-defined representation of the object; and
   pruning, by the processor, a portion of the first original document to obtain a pruned image; and
   blending, by the processor, using a blending technique, the first input image with the pruned image to obtain a modified image, wherein the modified image includes the pruned image bearing the first pre-defined representation;
   combining, by the processor, the modified image with the first original document to generate a training dataset.

16. The method as claimed in claim 15, the method comprising:
   training, by the processor, a neural network based model with the training dataset to obtain a trained model, and detecting automatically, by the processor, the object in the test document by utilizing the trained model.

17. The method as claimed in claim 15, wherein prior to detecting the object in the test document, the method comprising:
facilitating, by the processor, the test document to at least one of pre-processing and segmentation.

18. The method as claimed in claim 15, the method comprising:
augmenting, by the processor, the generated training dataset to obtain an augmented dataset,
wherein the augmenting includes processing the training dataset to perform at least one of noise removal, background editing, reduction of blurring effect, object cropping, object flipping, object rotation, object scaling, brightness adjustment, contrast adjustment and duplication of the first pre-defined representation of the object.

19. A non-transitory computer readable medium, wherein the readable medium comprises machine executable instructions that are executable by a processor to:
obtain a first input image from the plurality of input images and a first original document from the plurality of original documents, the first input image bearing a first pre-defined representation of the object, wherein the plurality of input images and the plurality of original documents are stored as digitized input datasets in a data lake, wherein each input image includes a pre-defined representation of the object; and
prune a portion of the first original document to obtain a pruned image; and
blend, using a blending technique, the first input image with the pruned image to obtain a modified image, wherein the modified image includes the pruned image bearing the first pre-defined representation; and
combine the modified image with the first original document to generate a training dataset.

20. The non-transitory computer readable medium as claimed in claim 19, wherein the readable medium comprises machine executable instructions that are executable by the processor to:
train a neural network based model with the training dataset to obtain a trained model; and
detect, automatically, the object in the test document by utilizing the trained model.

* * * * *